United States Patent

Raets

[11] Patent Number: 5,128,854
[45] Date of Patent: Jul. 7, 1992

[54] CIRCUIT ARRANGEMENT FOR SUPPLYING A LOAD

[75] Inventor: Hubert Raets, Nieuwenhagen, Netherlands

[73] Assignee: U.S. Philips Corporation, New York, N.Y.

[21] Appl. No.: 444,899

[22] Filed: Nov. 30, 1989

[30] Foreign Application Priority Data

Nov. 30, 1988 [DE] Fed. Rep. of Germany ....... 3840305

[51] Int. Cl.⁵ .......................................... H02M 5/453
[52] U.S. Cl. ........................................ 363/89; 363/44; 323/282
[58] Field of Search .................. 363/16, 21, 44, 47, 363/48, 89, 126, 67, 69, 70, 71, 72; 323/282–290

[56] References Cited

U.S. PATENT DOCUMENTS 4,821,166  4/1989  Albach ................................... 363/89
4,992,921  2/1991  Albach et al. ..................... 363/89 X

FOREIGN PATENT DOCUMENTS 2435392  2/1976  Fed. Rep. of Germany .

Primary Examiner—Steven L. Stephan
Assistant Examiner—Emanuel Todd Voeltz
Attorney, Agent, or Firm—Bernard Franzblau

[57] ABSTRACT

A simple circuit arrangement for supplying a load (10) with energy from a power supply means (1 to 5) ensures both a uniform energy supply of the load and a reliable suppression of interference, both from the load into the power supply mains and in the reverse direction. The circuit accomplishes the foregoing by utilizing at least two energy storage devices (7, 9), at least one of which can be alternately connected either to the load or to the power supply mains (1 to 5).

13 Claims, 5 Drawing Sheets

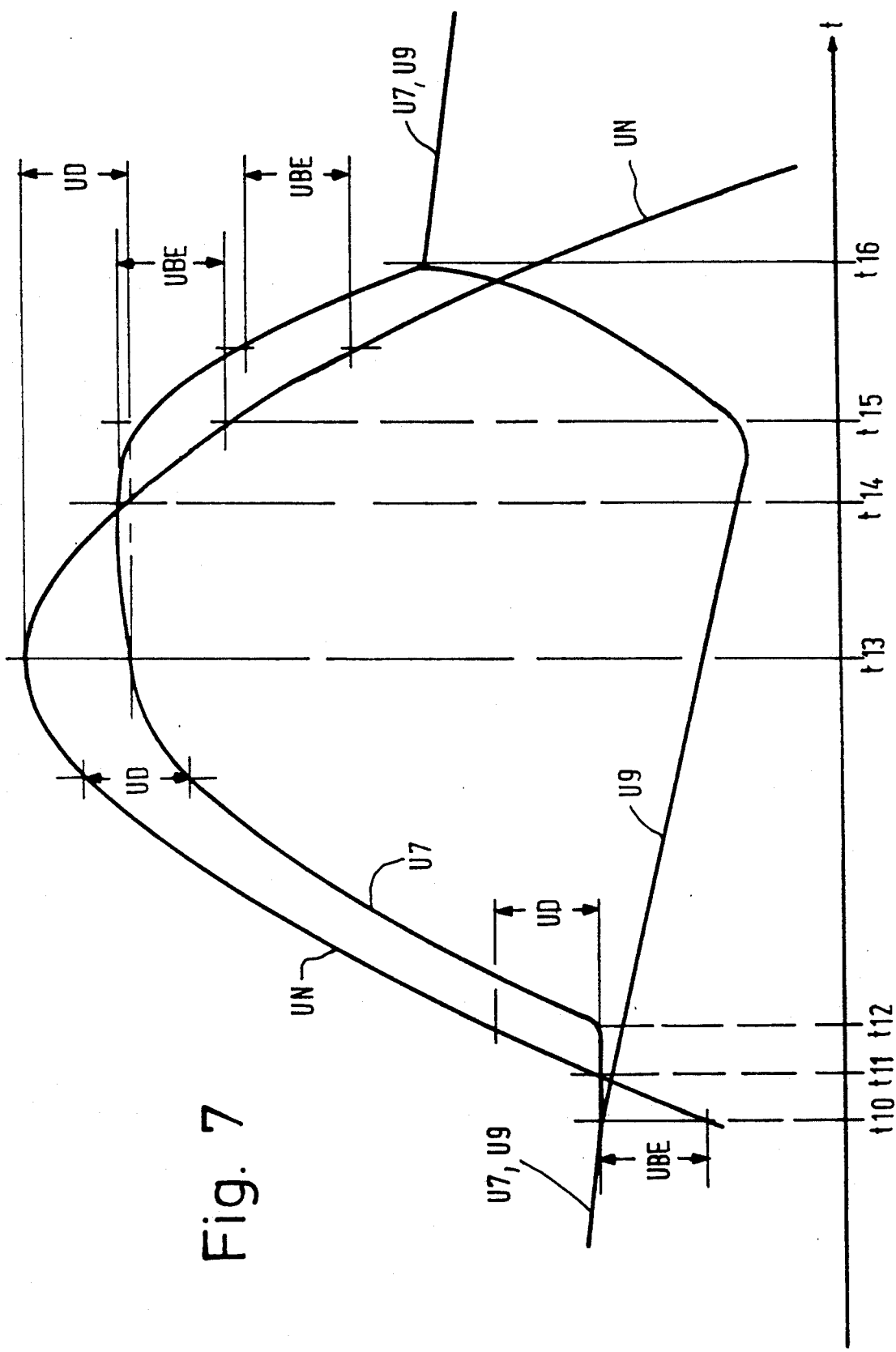

CIRCUIT ARRANGEMENT FOR SUPPLYING A LOAD

BACKGROUND OF THE INVENTION

This invention relates to a circuit arrangement for supplying a load with energy from a power supply mains.

German Patent Application P 37 22 337.2, to which U.S. Pat. No. 4,821,166 corresponds, describes a circuit arrangement for transferring electric power to a load from an alternating voltage source which is connected during given time intervals to an energy storage device for the purpose of supplying it with energy. The arrangement includes a switch which is periodically activated by a control circuit for deriving the energy for the load from the energy storage device. In this circuit arrangement high frequency disturbances produced therein are suppressed, i.e. kept away from the alternating voltage source, in that the control circuit renders the switch conductive only in time periods outside of the time intervals in which the alternating voltage source is connected to the energy storage device. This arrangement is particularly used especially in switched-mode power supplies which derive energy from a mains alternating voltage thereby generating interference voltages and currents due to the switching processes of the periodically activated switch, which interference voltages and currents should not be introduced into the mains alternating voltage. The connection or separation of the alternating voltage source and the energy storage device is preferably effected by a rectifier stage. In the time intervals in which the rectifier stage is in the conducting state for the purpose of recharging the energy storage device, the activation of the switch is interrupted so that this switch does not introduce any interference via the conducting rectifier stage into the alternating voltage source, i.e. the mains.

However, interrupting the activation of the switch also interrupts the supply of energy to a load which is fed by the switched mode power supply so that this load is periodically and not uniformly supplied with energy.

SUMMARY OF THE INVENTION

It is a object of the invention to provide a circuit arrangement which is simple but nevertheless ensures both a uniform energy supply of the load and a reliable suppression of interferences from the load to the power supply mains and vice versa.

In a circuit arrangement of the type described in the opening paragraph, this object is achieved by providing at least two energy storage devices, at least one of which can be alternately connected either to the load or to the power supply mains.

The invention make it possible to suppress interference by means of a simple circuit construction and with a uniform, uninterrupted supply of energy to the load. Elaborate high-frequency filters of conventional type are not required for this purpose. Interference originating both from the power supply mains and from the load can be suppressed with the arrangement. It is adapt and use the invention for any power supply mains and any load construction.

For the required alternate connection it is advantageous that at least one of the energy storage devices be arranged in a series circuit between a first and a second switching unit. The energy storage device is supplied with energy from the power supply mains via the first switching unit, while the load is supplied via the second switching unit. Preferably, at least two series circuits are arranged in parallel between the power supply mains and the load. Consequently, at any moment one of the energy storage devices may be constantly connected to and supply the load, while at least one further energy storage device is connected to the power supply mains so as to be supplied with energy.

The load is supplied with energy in a very uniform manner in that at least one of the energy storage devices is fixedly connected to the load. It is preferably supplied with energy from the series circuit(s).

All of the described embodiments of the invention have in common that at least one blocked switching unit is always arranged between the power supply mains and the load so that no interference can be transferred via the connection leads which connect the power supply mains via the switching units and the energy storage devices to the load.

A control circuit is preferably provided for controlling at least one of the switching units for alternately connecting at least one of the energy storage devices either to the power supply mains or to the load. This makes it possible to operate the circuit arrangement with an arbitrary power supply mains, for example, with direct or alternating currents of different frequencies and waveforms. Moreover, the supply of power from the power supply mains to the load can be controlled by the control circuit in accordance with different requirements, for example, for different types of loads.

In a further embodiment at least one of the first switching units, via which at least one of the energy storage devices can be connected to the power supply mains, is adapted to rectify an alternating voltage supplied by the power supply mains. To this end the relevant first switching units may consists of uncontrolled rectifiers or of rectifiers controlled by the control circuit.

It is very advantageous that the first switching unit(s) be exclusively controllable by the alternating voltage from the power supply mains. This enables a simple rectification of this alternating voltage and also a simple transfer of energy to the load via the energy storage devices.

It is also particularly advantageous that at least one of the second switching units be controllable by means of the control circuit after the first switching unit(s). The control hierarchy which is thereby determined provides a reliable functioning of the circuit arrangement in all operational cases, particularly for a fluctuating voltage in the power supply mains.

In a further embodiment the control circuit includes at least a potential shifting stage arranged between one of the first switching units and the associated energy storage device for generating a control voltage which can be applied to the associated second switching unit via a control branch. Such an arrangement provides a simple control of the associated second switching unit in dependence upon the operational conditions imposed on the associated first switching unit and without the requirement of a separate control logic with a separate current supply. The control circuit according to this embodiment of the invention can therefore be combined with the other compoents of the circuit arrangement in a very compact and inexpensive way. Moreover, its own energy consumption is small.

BRIEF DESCRIPTION OF THE DRAWING

Embodiments of the invention will now be described in detail with reference to the accompanying drawings, in which.

DESCRIPTION OF THE PREFERRED EMBODIMENTS

Figure 1:
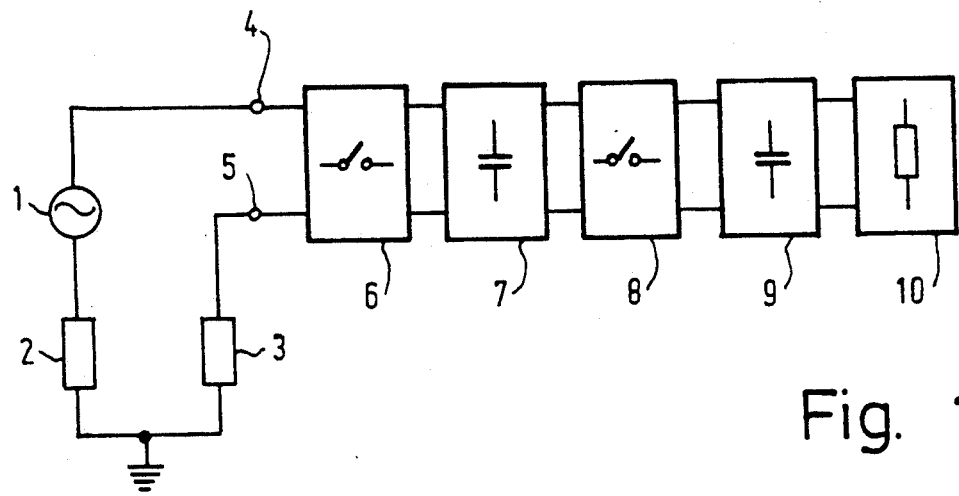
FIG. 1 is a block diagram of a first embodiment.

The block-schematic diagram according to FIG. 1 is the equivalent circuit diagram of a power supply mains comprising an (ideal) voltage source 1 and two mains impedances 2, 3 which are arranged in series with the voltage source 1 and constitute the internal resistance of the equivalent voltage source of the power supply mains. A junction point between the mains impedances 2 and 3 is connected to ground. The mains voltage of the power supply mains is available at its terminals 4, 5.

In FIG. 1 the power supply mains 1 to 5 is connected to a first switching unit 6 to which a series circuit of a first energy storage device 7, a second switching unit 8, a second energy storage device 9 and, as a termination, the load 10 is connected. During operation the first and second switching units 6 and 8 are alternately transferred to the conducting and the blocked state in such a way that only the first or the second switching unit 6 or 8 is conducting while the other switching unit is blocked. The first energy storage device 7 is thus alternately connected either to the power supply mains 1 to 5 or to the second energy storage device 9 and thus to the load 10. As a result energy from the power supply mains is alternately taken up by the first energy storage device 7 and subsequently transferred to the load 10 via the second energy storage device 9. The second energy storage device 9 serves as a buffer for energy which can be applied to the load 10 during the time intervals in which the second switching unit 8 is in the blocked state. This ensures a uniform energy supply for the load 10.

At the same time the described manner of operation of the switching units 6, 8 ensures that there is always a separation, i.e. a high-ohmic impedance in the form of at least one blocked switching unit, between the power supply mains 1 to 5 and the load 10. As a result interference can neither pass from the power supply mains 1 to 5 to the load 10 nor from the load 10 to the power supply mains 1 to 5. An interference-sensitive load 10 can thus be effectively shielded from interference voltages which may be present in the power supply mains 1 to 5 conversely, a load 10 causing interference, for example, a switched mode power supply, can be supplied by the power supply mains 1 to 5 without interference from the load 10 being transferred to the power supply mains.

Figure 2:
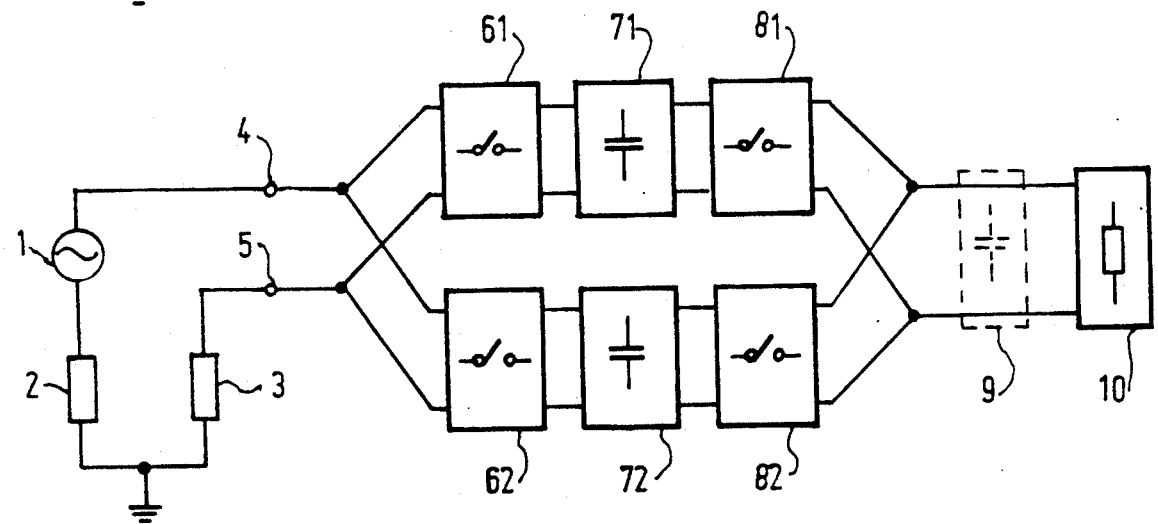
FIG. 2 is a block diagram of a second embodiment.

In a second embodiment, which is shown in FIG. 2 and in which components already described have identical reference numerals, a parallel circuit of two series circuits is arranged between the power supply mains 1 to 5 and the load 10, each of which circuits comprises a first switching unit 61, 62, a first energy storage device 71, 72 and a second switching unit 81, 82, respectively. Each of these series circuits 61, 71, 81 and 62, 72, 82 is operated in the same way as the series circuit made up of the first switching unit 6, the first energy storage device 7 and the second switching unit 8 according to FIG. 1. Additionally, the mutual relationship with respect to time of the switching states of the switching units 61, 62, 81 and 82 in the two series circuits is such that always one of the first energy storage devices 71, 72 is connected to the power supply mains 1 to 5 and that simultaneously the other is connected to the load 10, and conversely. While one of the first energy storage devices 71, 72 takes up energy from the power supply mains 1 to 5, the other storage device of the first energy storage devices 71, 72 supplies energy to the load 10 during the same period. At the end of this period the switching units 61, 62, 81, 82 are changed over in such a way that the first energy storage device 71, 72 which has just taken up energy is connected to the load 10 for supplying energy while the other first energy storage device 71, 72 which has just supplied energy to the load 10 is now connected to the power supply mains 1 to 5 so as to receive further energy. Thus, the first energy storage devices 71 and 72 are alternately connected to the power supply mains 1 to 5 and the load 10 in a kind of push-pull operation. As a result one of the two first energy storage devices 71, 72 is connected to the load 10 at any moment which is therefore supplied with energy in a more uniform way than by a single first energy storage device. Particularly with this arrangement an energy supply which is twice as large, i.e. a capacity which is twice as large, can be transferred from the power supply mains 1 to 5 to the load 10, than is possible in an arrangement according to FIG. 1. However, the number of components, particularly for the energy storage devices, does not increase in the same way as the amount of energy which can be supplied so that it provides a space-saving possibility for increased power supply capacity.

The parallel circuit shown can be augmented by further parallel branches in further series circuits which have a similar construction.

In order to achieve a smooth switching process when changing over the load 10 from one of the first energy storage devices 71, 72 to the other, a second energy storage device 9 may also be arranged between the second switching unit 81, 82 and the load 10, as is shown by way of a broken line in FIG. 2. However, as the time intervals to be bridged by this energy storage device are essentially shorter than in the arrangement according to FIG. 1, the second energy storage device 9 in FIG. 2 may be dimensioned to be substantially smaller, which also contributes to a simple, compact and inexpensive construction.

Figure 3:
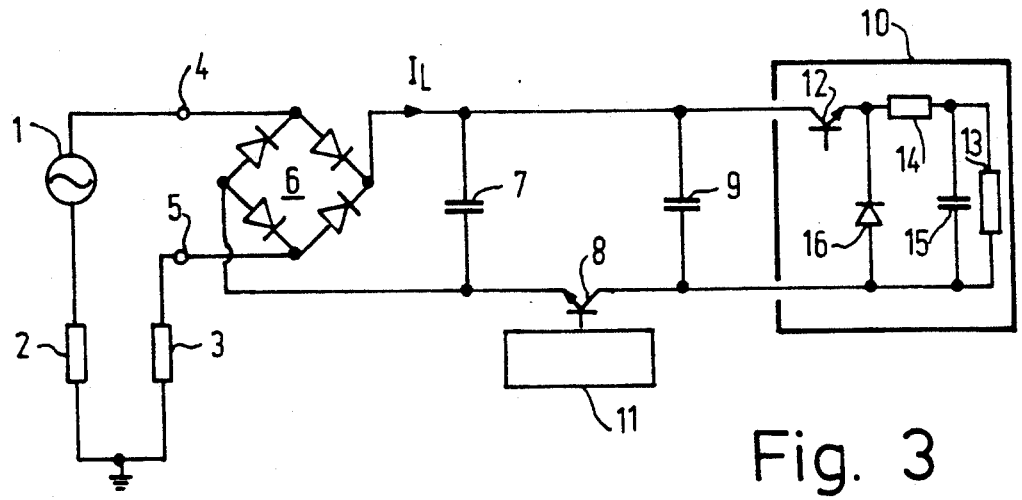
FIG. 3 shows a third embodiment in greater detail, and
FIGS. 4(a-d) show diagrams for operating the arrangement of FIG. 3.

FIG. 3 shows as a third embodiment a more detailed circuit arrangement in accordance with the block diagram shown in FIG. 1. As above, corresponding circuit components have identical reference numerals.

In FIG. 3 the first switching unit 6 is constituted by a bridge rectifier. The first switching unit 6 is thus also adapted to rectify the alternating voltage supplied by the voltage source 1 of the power supply mains 1 to 5. The first energy storage device 7—a capacitor in the present case—is supplied with energy by the pulsatory direct voltage occurring at the d.c. terminals of the first switching unit 6. The second switching unit 8 is constituted by a series transistor in the connection between the first energy storage device 7 and the second energy storage device 9—also a capacitor. The second switching unit 8 is controlled by a control circuit 11.

FIG. 3 also shows the construction of the load 10 as a switched mode power supply. It comprises a switching transistor 12 which periodically connects a series circuit of a consuming device 13 and an inductance 14 to the second energy storage device 9. A smoothing capacitor 15 is arranged parallel to the consuming device 13 and a freewheel diode 16 is arranged parallel to the series circuit of the inductance 14 and the consuming device 13. The switched mode power supply functioning as load 10 is operated in the conventional manner and will therefore not be further described.

The switching processes of the switching transistor 12 cause interference pulses in the load 10 which also reach a first switching unit 6 via the connection leads when the second switching unit 8 is conducting and these interference pulses would also be introduced into the power supply mains via the connection terminals 4 and 5 if the switching unit 6 were also conducting. The second switching unit 8 is therefore controlled by the control circuit 11 in such a way that it is only conductive during the time intervals when the first switching unit 6 is blocked.

The diagrams in FIG. 4 show the variation with time of the operation of the circuit arrangement according to FIG. 3. In the diagram according to FIG. 4a) the voltage U is presented versus time t at different points in the arrangement according to FIG. 3. The reference UG denotes the positive rectified halfwaves of the rectified alternating voltage of the power supply mains 1 to 5. Each of these positive halfwaves recharges the first energy storage device 7 in the time interval between the instants t1 and t2. The voltage U7 at the first energy storage device 7 follows the variation UG. The first switching unit 6, i.e. the bridge rectifier is conductive in the time interval between t1 and t2. This is diagrammatically shown in the diagram of FIG. 4c) in which the symbol "0" denotes the blocked state and the symbol "1" denotes the conducting state of the first switching unit 6. The recharge current IL flowing from the power supply mains 1 to 5 to the first energy storage device 7 is shown in the diagram of FIG. 4d).

Figure 4A:
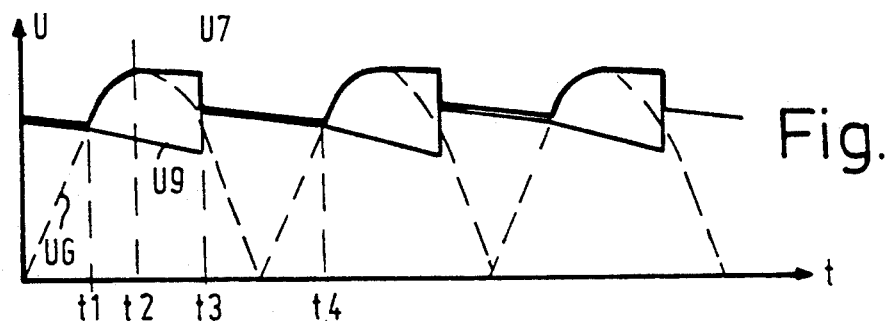
Figure 4B:
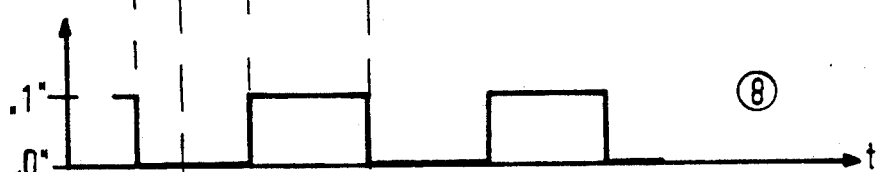
Figure 4C:
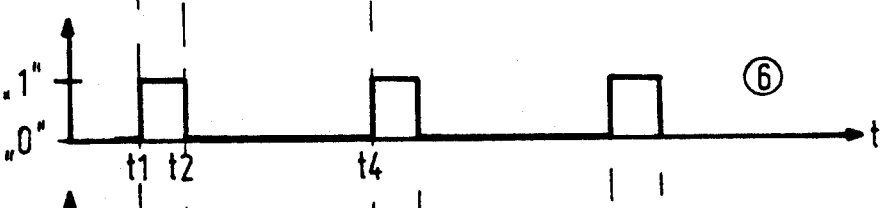
Figure 4D:
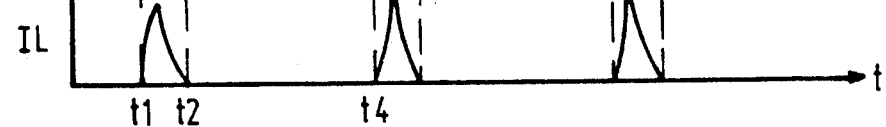

If the voltage UG decreases again after the instant t2, the first switching unit 6 is blocked and the voltage U7 at the first energy storage device 7 remains initially constant because the second switching unit 8 is also still blocked. This is shown in FIG. 4b) in a manner corresponding to that in FIG. 4c). The control circuit 11 keeps the second switching unit 8 in its blocked state up to an instant t3. The first energy storage device 7 is then separated both from the power supply mains 1 to 5 and from the second energy storage device 9 and the load 10 so that, except for leakage currents, the voltage U7 cannot vary.

As is shown in the diagram of FIG. 4b), the second switching unit 8 is transferred from the conducting to the blocked state by the control circuit 11 at the instant t1 and consequently the first energy storage device 7 is separated from the second energy storage device 9. In the time interval between the instants t1 and t3 the load 10 is thus only supplied by the second energy storage device 9 so that the voltage U9 occurring at this storage device steadily decreases from the instant t1, cf. FIG. 4a).

At the instant t3, when the second switching unit 8 is transferred to the conducting state again, the first energy storage device 7 is completely charged while the second energy storage device 9 has reached its lowest discharge state during the operation shown. By switching the second switching unit 8, a balancing process between the first and the second energy storage device 7 and 9 is initiated; energy flows from the first energy storage device 7 into the second energy storage device 9 so that the voltage U7 at the first energy storage device 7 decreases while the voltage U9 at the second energy storage device 9 simultaneously increases. After termination of this balancing process the two voltages are identical, apart from a voltage loss at the second switching unit 8, which loss is not shown. The instant t3 is chosen in such a way that the voltage U7 during the balancing process does not become lower than the instantaneous value of the rectified voltage UG, because otherwise the first switching unit 6 would again become conductive at the instant t3.

The load 10 is supplied from the parallel arrangement of the first and second energy storage devices 7 and 9, while the voltages U7 and U9 decrease to the same extent until they become equal at the instant t4 to the increasing voltage of the next halfwave of the rectified voltage UG of the power supply mains 1 to 5. At this instant t4, the first switching unit 6 becomes conducting again and the second switching unit 8 is transferred to the blocked state by the control circuit 11. This change is shown in FIGS. 4b) and 4c). During the time when the load 10 is only supplied by the second energy storage device 9, a recharge current IL flows again through the first switching unit 6 and the operation is are repeated as from the instant t1.

The control circuit 11 may have different constructions. In one embodiment a voltage which is proportional to the rectified voltage UG of the power supply mains 1 to 5 is derived by a voltage divider suppled by the power supply mains 1 to 5 via diode and this voltage is compared with a reference voltage via a comparator. The comparator supplies a signal which is associated with a given fixed instant of each positive halfwave of the rectified voltage UG. Instants which are shifted with respect to this instant for controlling the second switching unit 8 can be generated by correspondingly dimensioned monostable flipflops.

In a further embodiment a low-ohmic measuring resistor is arranged in the lead to the first energy storage device 7, with which resistor the recharge current IL and particularly its steeply rising edge is measured right after the instant t1. The second switching unit 8 can then be switched via monostable flipflops which determine the instant t3.

As a modification of the examples described, the instant t3 can also be determined in the control circuit 11 by a comparison between the measured voltages U7 and U9 at the energy storage devices 7, 9 and the rectified voltage UG, which is measured in the manner described. The instant t3 is reached when the sum U7+U9 exceeds a given multiple of the instantaneous value of the rectified voltage UG and which is dependent on the proportions of the energy storage devices 7 and 9. The latter variant has the advantage that the circuit automatically compensates fluctuations of the voltage of the power supply mains 1 to 5 and of the current flowing in the load 10.

Similarly to conventional arrangements, the voltage U9 at the second energy storage device 9 with which the load 10 is supplied has an essentially sawtooth-shaped ripple in the circuit arrangement according to the invention. However, in the case of a predetermined maximum permissible ripple the first and second energy storage devices 7 and 9 combined are not larger than an energy storage device required for the same ripple in conventional circuit arrangements so that with reference to these components, which require relatively much space, the number of components is not increased in the circuit arrangement according to the invention.

In addition to the embodiment of the first switching unit 6 shown as a bridge rectifier in FIG. 3 and the second switching unit 8 shown as a bipolar transistor and the energy storage devices as capacitors, other embodiments are also possible. Instead of an uncontrolled switch, which only reacts to the difference between the voltages between its input and its output, it is also possible to use controlled switches as a first switching unit, for example, instead of the diodes in the bridge rectifier. Preferably, transistors are used as controlled switches. As a result the switching units can also be used at different switching frequencies than are determined by an alternating voltage transferred through the power supply mains. More particularly, a plurality of switching cycles of the switching units can be performed during each halfwave of the rectified voltage UG.

Instead of the energy storage devices in the form of capacitors it is optionally possible to use accumulators. In suitably designed embodiments inductances can, however, also be used as the energy storage devices.

Furthermore, the first switching units for adapting the voltage at the power supply mains to the voltage required for supplying the load may be combined with a mains transformer, for example, in the form of a switched or non-switched halfwave or fullwave rectifier. For the second switching units, a bipolar version (i.e. one in which each line between capacitors 7 and 9 include a transistor 8 controlled by the control circuit 11) can be used instead of the unipolar embodiment of FIG. 3.

For the selection of the switching frequency, particularly for the first switching units, it is to be taken into account that the switching processes performed therewith do not lead to interference signals.

A particular advantage of the interference suppression achieved by the circuit arrangement according to the invention is not only the interference-free operation but also the possibility, particularly for a load 10 formed as a switched mode power supply, of dimensioning the necessary tolerance for voltage fluctuations of the required switching transistor to an essentially smaller extent than would be necessary without the interference suppression according to the invention. In switched mode power supplies in which the switching transistor is subjected without interference suppression to the voltage of the power supply mains, the tolerance to voltage fluctuations is determined by taking into account a safety margin, which is often considerable, for interference, particularly so-called mains transients. This safety margin may be of the order of several 100 Volts. This means that much stricter requirements must be imposed on such switching transistors. However, these requirements may be dispensed with when using the circuit arrangement according to the invention so that simpler and essentially cheaper components having a lower cut-off voltage can be used. When integrating the components of such a switched mode power supply on a semiconductor body, simplifications and lower costs are achieved in the choice of the component geometry and the method of manufacture.

Figure 5:
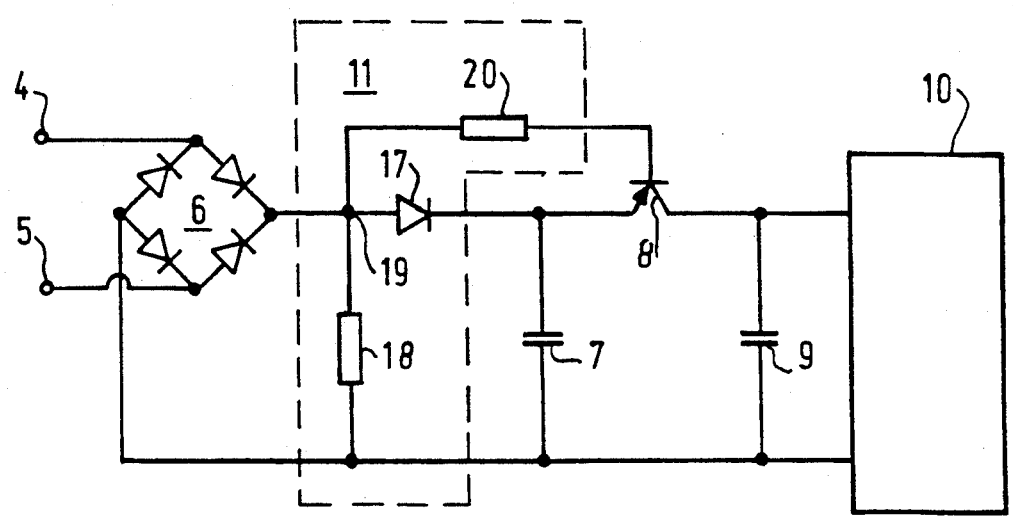
FIG. 5 shows a fourth embodiment, and
FIGS. 6(a-c), 7 show diagrams for operating this arrangement.

FIG. 5 shows a further embodiment having a very simple and reliable design for the control circuit 11. Components already described again have the same reference numerals. In its fundamental construction the arrangement corresponds to the embodiment of FIG. 3. The control circuit 11 comprises a potential shift stage comprising a series diode 17 in the connection lead between the first switching unit 6 and the first energy storage device 7 and a shunt resistor 18 which shunts the d.c. terminals of the first switching unit 6. At the junction point 19 between one of the d.c. terminals of the switching unit 6, the series diode 17 and the shunt resistor 18, the potential shift stage 17, 18 provides a control voltage which is applied via a resistor 20, forming a control branch, to the control terminal of the second switching 8 unit, which is a bipolar PNP transistor in the exemplary case.

Figure 6A:
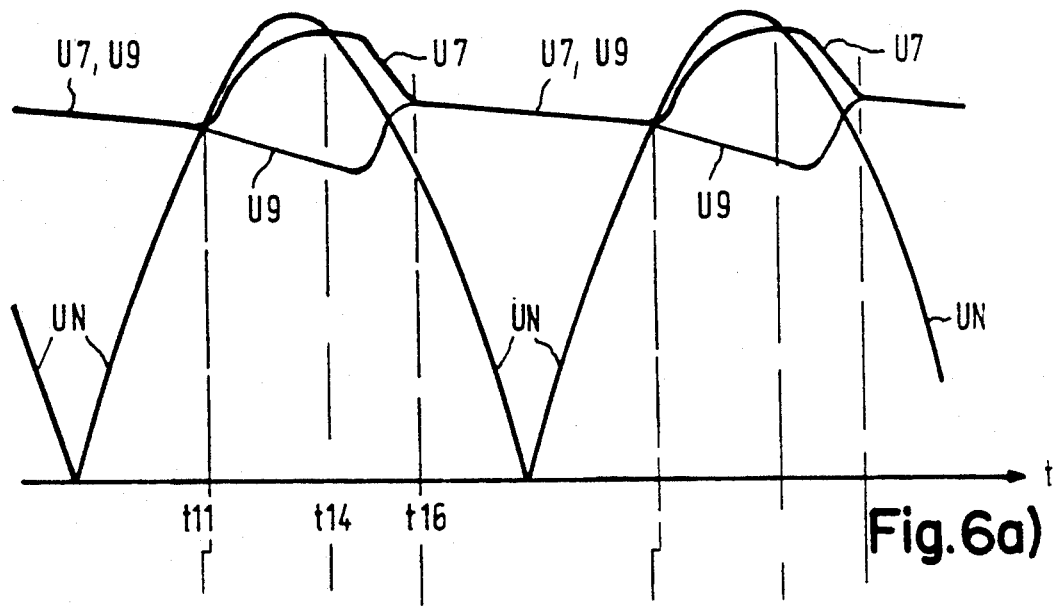

The operation of the circuit arrangement according to FIG. 5 is shown in the diagrams of FIGS. 6 and 7. FIG. 6a), which essentially corresponds to FIG. 4, shows some voltage waveforms in the circuit arrangement according to FIG. 5 The reference UN denotes the pulsatory d.c.-voltage produced by the first switching unit 6 by rectifying the alternating voltage of the power supply mains 1 to 5 and as made available at the d.c. terminals of the first switching unit 6. The voltage waveform UN thus already allows for voltage shifts due to the construction of the first switching unit 6 with non-ideal rectifier elements. The reference U7 denotes the voltage at the first energy storage device 7 and U9 denotes that at the second energy storage device 9. FIG. 7 shows the voltage waveforms in greater detail in the range of the halfwave peaks of the pulsatory d.c.-voltage UN in which the switching processes of the first and second switching units 6 and 8 are carried out. The reference t again denotes the time—plotted on the abscissa.

In the operational state of the circuit arrangement the pulsatory d.c.-voltage UN is smaller than the voltage U7 at the first energy storage device 7 in the time interval before the instant t10 (FIG. 7). The series diode 17 is therefore blocked. The pulsatory d.c.-voltage UN which is present at the junction point 19 is applied via the resistor 20 as a control voltage to the control terminal of the second switching unit 8. As long as the difference between the pulsatory d.c.-voltage UN and the voltage U7 at the first energy storage device 7 exceeds the forward voltage of the base-emitter diode of the second switching unit 8, the latter unit is in the conducting state so that the first and second energy storage devices 7 and 9 are interconnected and the same voltage is present at these storage devices. In this time interval the variation of the voltage U9 at the second energy storage device 9 thus corresponds to the variation of the voltage U7.

If the said difference between the voltages UN and U7 becomes smaller than the forward voltage UBE of the base-emitter diode of the second switching unit 8, i.e. when the interval t10 is passed, this diode is transferred more and more to its blocked state as the difference decreases. The series diode 17 is further in its blocked state. As a result the connection between the first and the second energy storage devices 7 and 9 is gradually broken so that the load 10 is more and more supplied only by the second energy storage device 9. The voltage U9 at the second energy storage device 9 therefore starts to decrease at a faster rate than in the time interval before the instant t10, while the voltage U7 at the first energy storage device 7 decreases more slowly.

At the instant t11 the value of the pulsatory d.c.-voltage UN corresponds to the value of the voltage U7 at the first energy storage device 7. At this instant the voltage which is present across the series diode 17 and hence also that which is present across the base-emitter path of the second switching unit 8 disappears. The series diode 17 is still completely blocked at the instant t11 while the second switching unit 8 has just reached its completely blocked state.

If the pulsatory d.c.-voltage UN further increases, the second switching unit 8 is driven further into its blocked state while the series diode 17 gradually changes over to the conducting state. This is achieved when the value of the pulsatory d.c.-voltage UN at the instant t12 is larger than the voltage U7 at the first energy storage device 7 by exactly one diode forward voltage UD of the series diode 17. The first energy storage device 7 is now charged by means of the pulsatory d.c.-voltage UN via the first switching unit 6 which changes over to the conducting state simultaneously with the series diode 17. The voltage U7 at the first energy storage device 7 therefore tracks the pulsatory d.c.-voltage UN by the diode forward voltage UD.

On the other hand the load 10 is further supplied only by the second energy storage device 9 so that at this storage device the voltage U9, with the greater variation reached at the instant t11, further decreases. From the instant t12 the series diode 17 is in its saturated state.

At the instant t13 the pulsatory d.c. voltage UN at the junction point 19 reaches its peak value and subsequently decreases again. As a result the difference between the pulsatory direct voltage UN and the voltage U7 at the first energy storage device 7 is reduced again after the instant t13 so that the series diode 17 is transferred from its saturated state back to its blocked state. As long as the series diode 17 is still conducting, however, the first energy storage device 7 is also further charged to a small extent so that the voltage U7 increases still further until at the instant t14 the pulsatory direct voltage UN corresponds to the voltage U7 on the first energy storage device 7 and the series diode 17 is completely blocked. The charging process of the first energy storage device 7 in this halfwave of the pulsatory direct voltage UN is terminated thereby and also the first switching unit 6 changes over to the blocked state.

Up to the instant t14 the voltage U9 at the second energy storage device 9 also further decreases steadily because the second switching unit 8 is still blocked.

Since the pulsatory d.c. voltage UN becomes smaller than the voltage U7 at the first energy storage device 7 after the instant t14, the series diode 17 remains in its blocked state while the second switching unit 8 receives a control voltage via the resistor 20, which voltage transfers it to the conducting state. As a result the connection for supplying energy from the first energy storage device 7 to the second energy storage device 9 is established. Since the first energy storage device 7 is completely charged and the second energy storage device 9 is essentially discharged to its lowest voltage, the energy starts to flow from the first energy storage device 7 into the second energy storage device 9 so that the voltage U7 at the first energy storage device 7 decreases while the voltage U9 at the second energy storage device 9 begins to increase. At the instant t15 the difference between the pulsatory d.c.-voltage UN and the voltage U7 at the first energy storage device 7 reaches a value at which the second switching unit 8 has changed completely to the conducting active state of the bipolar transistor constituting this unit. From this instant the variation of the voltage U7 follows that of the pulsatory d.c.-voltage UN which controls the second switching unit 8 via the junction point 19 and the resistor 20. Simultaneously with the above-described controlled discharged of the first energy storage device 7, the second energy storage device 9 is charged with the energy supplied by the storage device 7. The reversal of the charge of the energy storage devices 7 and 9 is determined by the rate at which of the falling edge of the pulsatory d.c.-voltage UN changes. If the charge were reversed more slowly, i.e. if the voltage U7 decreased more slowly, the second switching unit 8 would become saturated which would result in the reversal of the charge being accelerated. Conversely, in the case of a too fast discharge the difference between the pulsatory d.c.-voltage UN and the voltage U7 would become too small so that the second switching unit 8 would immediately be brought more strongly towards its blocked state. As a result the reversal of the charge would be slowed down.

At the instant t16 the voltages U7 and U9 at the energy storage devices 7 and 9 are balanced and the process of reversing the charge is terminated. When the pulsatory d.c.-voltage UN is further decreased, and as was hitherto the case, the voltage U7 at the first energy storage device 7 no longer follows the voltage UN with a lag equal to the forward voltage (UBE) of the base-emitter path of the second switching unit 8. Rather, the common decrease of the voltages U7 and U9 is only determined by the energy flow into the load 10. With a decreasing pulsatory d.c. voltage UN the difference between the voltages U7 and UN becomes larger so that the second switching unit 8 is driven into its saturated conducting state via the resistor 20. This state subsequently remains unchanged until the next halfwave of the pulsatory d.c. voltage UN for which the operation described for the period from instant t10 on is repeated correspondingly.

The described voltage variations and values also ensure that the series diode 17 continuously remains in its blocked state and that accordingly the first switching unit 6 is in the its blocked state.

Figure 6B:
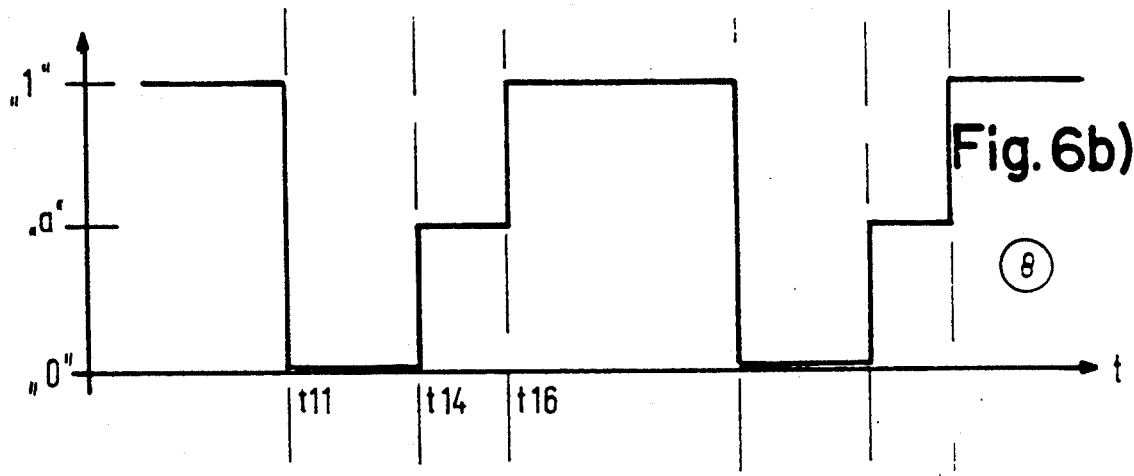
Figure 6C:
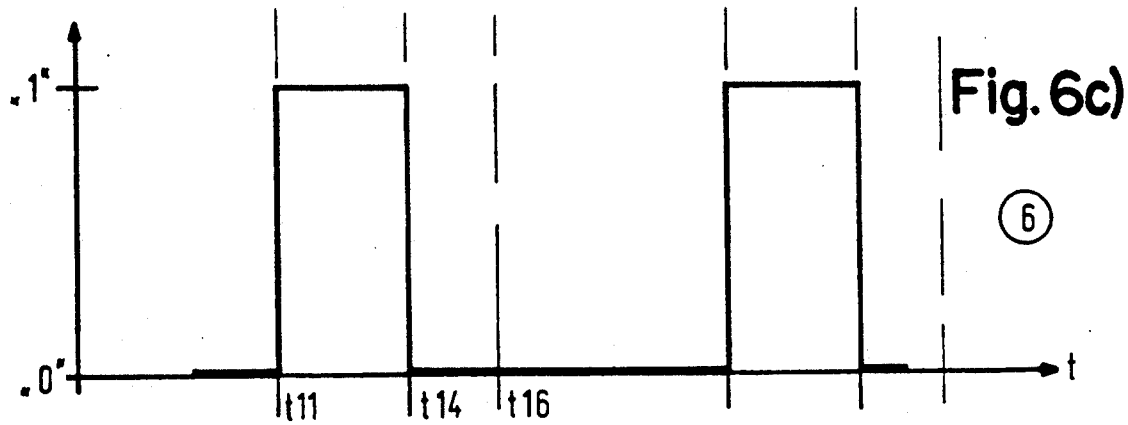

The diagrams of FIGS. 6b) and c) show in a simplified form and in a manner corresponding to FIGS. 4b) and c) the states of the first and second switching units 6 and 8 as a function of the time t. Before the instant t11 the first switching unit 6 is in the blocked state designated as "0" in the diagram according to FIG. 6c) while the second switching unit 8 is in the conducting-saturated-state designated by "1". At the instant t11 these states are changed; before that instant the second switching unit 8 has changed over to the blocked state in conformity with a transfer to the state "0" in the diagram of FIG. 6b). This transfer is shown in a simplified form as a perpendicular edge. After the instant t11 the first switching unit 6 assumes the conducting state. At the instant t14 the first switching unit 6 changes back to the blocked state while the second switching unit 8 is changed over to the active state "a" of the bipolar transistor constituting this unit and remains in this state until the instant t16. The active state "a" is shown as a conducting intermediate state in FIG. 6b). At the instant t16 the second switching unit 8 assumes the conducting, saturated state "1" while the first switching unit 6 is further into its blocked state "0". This operation is repeated in a corresponding manner in the subsequent halfwave of the puslatory d.c. voltage UN.

It is further evident from the foregoing that in the arrangement according to FIG. 5 the time intervals in which the switching units 6 and 8 assume their conducting or blocked states are always separated from each other, i.e. they cannot overlap because of the special generation of the control voltage for the second switching unit 8. Thus, a high-ohmic separation between the power supply mains 1 to 5 and the load 10 is always ensured.

In order to keep the transmission of interference as small as possible via the resistor 20, this resistor is dimensioned to be as large as possible. Therefore, a current amplification as high as possible is aimed for in the transistor constituting the second switching unit 8 in order that the control current via the resistor 20 can be kept as small as possible in the case of a predetermined current for the transfer of energy from the first energy storage device 7 to the second energy storage device 9.

Figure 8:
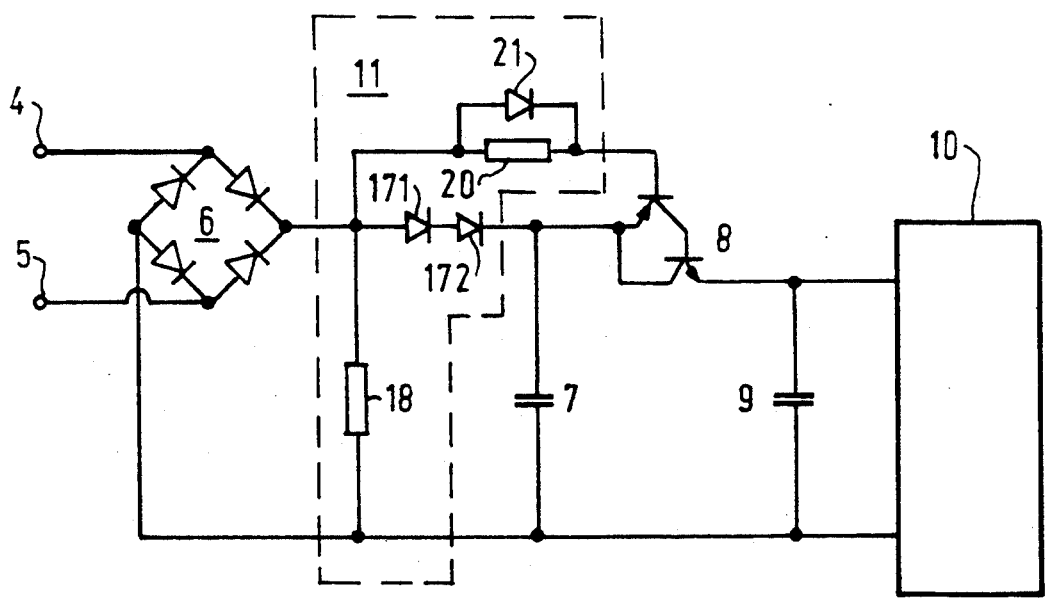
FIG. 8 shows a fifth embodiment.

FIG. 8 shows a modification of the embodiment according to FIG. 5 in which the second switching unit 8 is in the form of a combination of a PNP transistor and an NPN transistor for increasing the current amplification. To obtain the ratios between the voltages when controlling this version of the second switching unit 8; a series circuit of two series diodes 171, 172 replaces the series diode 17. Moreover, a discharge diode 21 is arranged parallel to the resistor 20 in the control branch, which diode ensures a fast discharge of the base zone of the pnp transistor of the second switching unit 8.

The circuit arrangements according to FIGS. 5 and 8 have a very simple construction. More particularly, the control circuits 11 in these arrangements do not require any separate logic circuits and no separate energy supplies are required for these circuits. The interference suppression achieved with these circuit arrangements is very good because, more particularly, fluctuations of the voltage at the power supply mains 1 to 5 and fluctuations of the energy being taken up by the load 10 are automatically compensated. The operation of the interference suppression is also ensured in the case of a variation with respect to time of the voltage at the power supply mains and hence the pulsatory d.c. voltage UN. Due to the small number of required components the circuit arrangement can be constructed in a simple manner and at a low cost even for larger energies to be transferred, and in particular it can be integrated on a semiconductor body.

I claim:

1. A circuit for supplying energy to a load from an AC power supply comprising:
   first and second input terminals for receiving AC energy from the AC power supply,
   first and second energy storage devices,
   a first rectifier-type switching unit coupling said first and second input terminals to the first energy storage device,
   means coupling said first energy storage device in cascade between the first switching unit and a second controllable switching unit,
   means coupling the second switching unit, the second energy storage device and the load in cascade,
   a control circuit coupled to the DC side of the first rectifier-type switching unit and to a control electrode of the second switching unit so that at least one of said energy storage devices is connected to the load during a first time interval and to the input terminals during a second time interval, wherein said control circuit operates said second switching unit so that said first switching unit and said second switching unit are alternately conductive and said first and second time intervals do not overlap one another, and
   wherein said one energy storage device comprises a capacitor.

2. A circuit as claimed in claim 1, wherein the other one of the energy storage devices (9) is fixedly connected to the load.

3. A circuit as claimed in claim 1 wherein the control circuit includes at least one potential shift stage coupled between said DC side of the first switching unit and the first energy storage device for generating a control voltage which is applied to the control electrode of the second switching unit via a control branch of the control circuit.

4. A circuit as claimed in claim 1 further comprising a switched mode power supply circuit connected in cascade between the second energy storage device and the load, wherein said switched mode power supply circuit includes a third energy storage device connected in parallel with the load.

5. A circuit as claimed in claim 4 wherein the first switching unit is exclusively controlled by means of the AC alternating voltage from the power supply.

6. A circuit as claimed in claim 4 wherein the first switching unit is arranged to rectify an alternating voltage supplied by the input terminals.

7. A circuit as claimed in claim 1 wherein said first and second energy storage devices comprise first and second capacitors, respectively.

8. A circuit for supplying energy to a load from an AC power supply comprising:
   a first series circuit including a first switching unit, a first energy storage device and a second switching unit connected between the AC power supply and the load,
   a second series circuit including a third switching unit, a second energy storage device, and a fourth switching unit connected between the AC power supply and the load and in parallel with the first series circuit, and wherein
   said first and second switching units alternately connect said first energy storage device either to the load or to the AC power supply and said third and fourth switching units alternately connect the second energy storage device either to the load or to the AC power supply.

9. A circuit as claimed in claim 8 further comprising a third energy storage device fixedly connected to the load.

10. A circuit as claimed in claim 9, wherein a control circuit controls at least one of the switching units for alternately connecting at least one of the energy storage devices either to the AC power supply or to the load.

11. A circuit as claimed in claim 9, wherein at least one of the first and third switching units is arranged to rectify an alternating voltage supplied by the AC power supply.

12. A circuit as claimed in claim 8 wherein a control circuit controls at least one of the switching units for alternately connecting at least one of the energy storage devices either to the AC power supply or to the load.

13. A circuit as claimed in claim 8, wherein at least one of the first third switching units is arranged to rectify an alternating voltage supplied by the AC power supply.

* * * * *